UNITED STATES PATENT OFFICE.

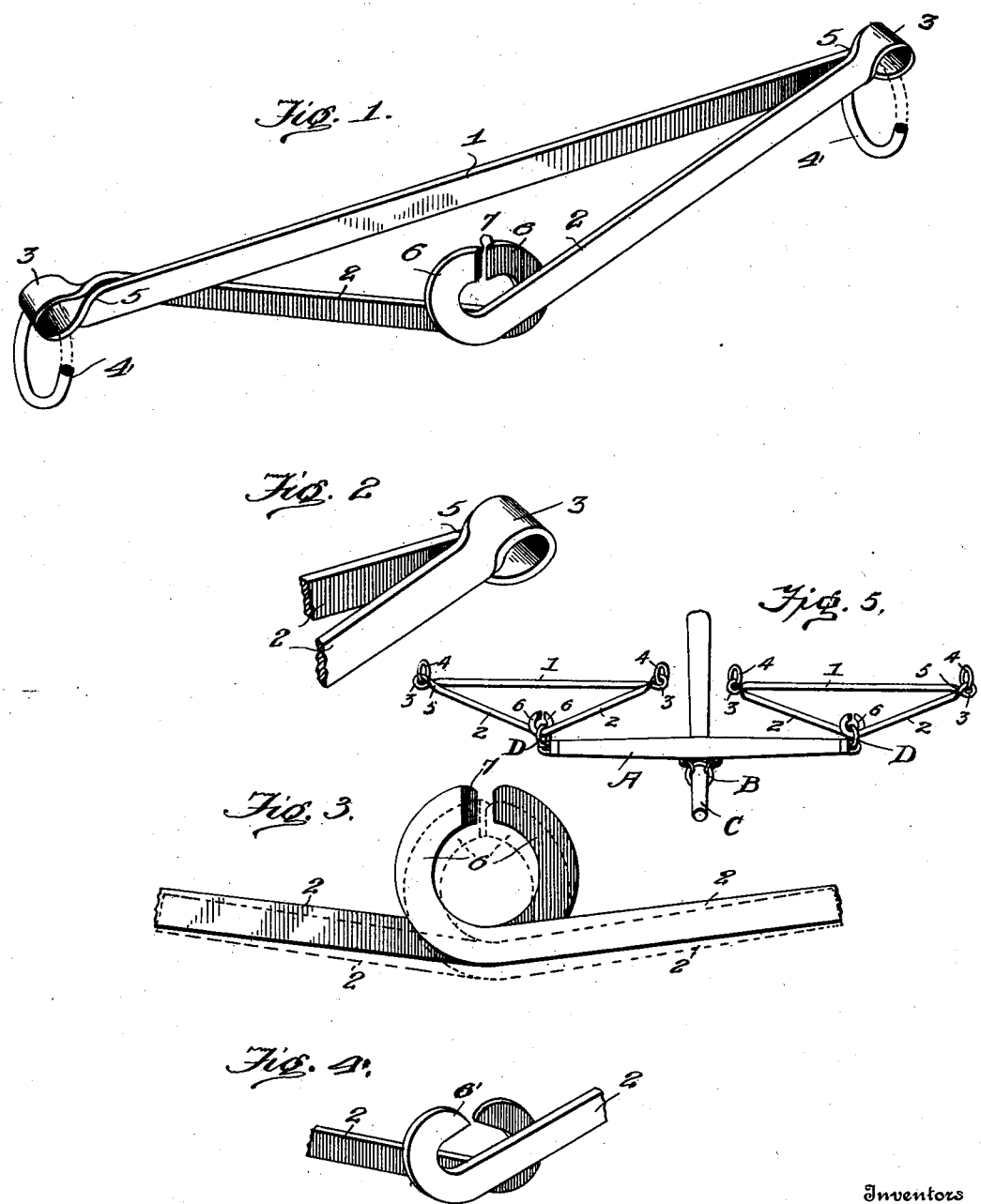

FRANK A. NASON AND BERTON SMITH, OF CLEARFIELD, PENNSYLVANIA.

NECK-YOKE.

SPECIFICATION forming part of Letters Patent No. 705,428, dated July 22, 1902.

Application filed April 3, 1902. Serial No. 101,244. (No model.)

*To all whom it may concern:*

Be it known that we, FRANK A. NASON and BERTON SMITH, citizens of the United States, residing at Clearfield, in the county of Clearfield and State of Pennsylvania, have invented certain new and useful Improvements in Neck-Yokes; and we do declare the following to be a full, clear, and exact description of the invention, such as will enable others skilled in the art to which it appertains to make and use the same.

This invention relates to improvements in neck-yokes.

The object of the invention is to provide a neck-yoke which shall be simple of construction, durable and effective in use, and comparatively inexpensive of production.

With this and other objects in view, which will readily appear as the nature of the invention is better understood, said invention consists in certain novel features of construction and combination and arrangement of parts, as will be hereinafter fully described, defined in the appended claims, and illustrated in the accompanying drawings, in which—

Figure 1 is a perspective view of the neck-yoke. Fig. 2 is a detail perspective view showing the formation of one of the eyes and the coacting stop-shoulders. Fig. 3 is a detail view illustrating the locking action of the lap-ring hooks. Fig. 4 is a perspective view of a modified form of yoke. Fig. 5 is a view showing the application of the invention to a neck-yoke bar and pole-tip.

Referring now more particularly to the drawings, the numeral 1 designates the main bar of the yoke, which is preferably made of spring metal and terminates in two diagonally-extending underlying arms 2. At the point where the ends of the arms are bent eyes 3 are formed for the rings 4, to which the breast straps or chains are adapted to be connected. These eyes are preferably formed by extending the arms upon opposite sides of the bar 1 and giving them a half-twist at their inner ends or points of connection with the bar, whereby stop-shoulders 5 are provided to interlock and prevent undue spreading of the arms. The inner ends of the diagonally-extending arms are each provided with a hook 6, projecting in reverse directions in such manner as to form a lap-ring. The meeting ends of the hooks are formed with opposing beveled faces 7 to admit of the ready insertion of a ring D between them and to engage each other to form a locking connection to further prevent any tendency of the hooks separating and releasing the ring under strain. The arms 2 are free to yield both toward and from the bar and in a direction laterally or transversely thereof, and the ring is slipped into place by first spreading the hooks laterally and bringing the ring between them and then spreading said hooks apart by moving the arms toward the bar, so as to allow the ring to pass into the space between the hooks, through the open ends thereof. When undue pulling strain falls upon the yoke, undue outward movement of the arms is prevented by the stop-shoulders 5, which contact and prevent any outward yielding of said arms beyond a certain degree, so as to prevent the hooks from opening and releasing the ring. This action is also promoted by the beveled ends of the hooks, which when the arms move outward to a certain extent come in contact and interlock, thereby preventing them from spreading and releasing the ring. It will thus be seen that the only way by which a ring may be disengaged from the neck-yoke is by spreading the arms apart, so as to separate the hooks in the manner described to permit of the removal of the ring.

In the construction shown in Fig. 4 the hooks 6' have pointed ends, which are slightly outturned one away from the other, and one hook lies in a plane slightly above the other, thus enabling the ring to be more readily engaged or disengaged by a proper manipulation in the manner heretofore described, while at the same time preventing casual disengagement of said ring.

It will be understood, of course, that in the construction shown in Figs. 1, 2, and 3 the abutting shoulders of the eyes and the interlocking ends of the hook when used together produce a more effective action in preventing the spreading of the arms than where either of these features is employed alone; but in some cases, as when the neck-yoke is not liable to be subjected to heavy strain, we may employ either of these features independently of the other.

In Fig. 5, showing the application of the invention, A is a spreader-bar carrying the neck-yoke center B, which receives the pole-tip C and which is provided at its ends with rings D to engage the lap-rings of a pair of the neck-yokes, one of which is employed at each end of the bar. From this illustration the mode of use of the invention as a whiffletree will also be understood.

The invention is also susceptible of use as a whiffletree and for many other analogous purposes.

From the foregoing description, taken in connection with the accompanying drawings, it is thought that the construction, mode of operation, and advantages of our improved neck-yoke will be readily apparent without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

1. A neck-yoke comprising a bar having diagonally-projecting arms formed with coacting hooks at their inner ends to produce a lap-ring, means for limiting the outward movement of said arms to prevent separation of the hooks, substantially as and for the purpose set forth.

2. A neck-yoke comprising a bar, the ends of which are twisted to form eyes and coacting abutting shoulders and thence extended to provide diagonally-projecting arms, the ends of said arms being formed with opposing hooks which overlap each other to form a lap-ring, said shoulders acting to limit the outward movement of said arms, substantially as described.

3. A neck-yoke comprising a bar having diagonally-projecting arms formed with coacting hooks at their inner ends to produce a lap-ring, said hooks having ends arranged to abut to limit the outward movement of said arms, substantially as specified.

4. A neck-yoke comprising a bar having diagonally-projecting arms formed with coacting hooks at their inner ends to produce a lap-ring, the ends of the bar being twisted to form eyes and coacting stop-shoulders, and the hooks having abutting ends coacting with said shoulders to limit the outward movement of said arms, substantially as set forth.

5. A neck-yoke comprising a bar having diagonally-projecting arms yieldable toward and from the bar and also laterally thereof, said arms being formed with coacting hooks at their inner ends to produce a lap-ring, substantially as set forth.

In testimony whereof we have hereunto set our hands in presence of two subscribing witnesses.

F. A. NASON.
BERTON SMITH.

Witnesses:
L. W. LUCE,
GEO. W. POWELL.